US011410436B2

(12) United States Patent
Ye et al.

(10) Patent No.: US 11,410,436 B2
(45) Date of Patent: Aug. 9, 2022

(54) METHOD AND SYSTEM FOR VISION-BASED VEHICLE INTERIOR ENVIRONMENT SENSING GUIDED BY VEHICLE PRIOR INFORMATION

(71) Applicant: Robert Bosch GmbH, Stuttgart (DE)

(72) Inventors: Mao Ye, San Jose, CA (US); Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/043,311

(22) PCT Filed: Mar. 14, 2019

(86) PCT No.: PCT/EP2019/056392
§ 371 (c)(1),
(2) Date: Sep. 29, 2020

(87) PCT Pub. No.: WO2019/185359
PCT Pub. Date: Oct. 3, 2019

(65) Prior Publication Data
US 2021/0034888 A1    Feb. 4, 2021

Related U.S. Application Data

(60) Provisional application No. 62/649,624, filed on Mar. 29, 2018.

(51) Int. Cl.
*G06K 9/00*   (2022.01)
*G06V 20/59*   (2022.01)
(Continued)

(52) U.S. Cl.
CPC ........... *G06V 20/59* (2022.01); *G06K 9/6215* (2013.01); *G06T 5/50* (2013.01); *G06T 7/74* (2017.01);
(Continued)

(58) Field of Classification Search
CPC .... G06K 9/00832; G06K 9/6215; G06T 7/74; G06T 5/50; G06T 2207/20208;
(Continued)

(56) References Cited

U.S. PATENT DOCUMENTS 7,477,758 B2   1/2009   Piirainen et al.
7,676,062 B2   3/2010   Breed et al.
(Continued)

FOREIGN PATENT DOCUMENTS

DE   10 2012 024 650 A1   6/2014
DE   10 2018 110 430 A1   11/2018
(Continued)

OTHER PUBLICATIONS

International Search Report corresponding to PCT Application No. PCT/EP2019/056392, dated Jun. 13, 2019 (4 pages).
(Continued)

*Primary Examiner* — Dhaval V Patel
(74) *Attorney, Agent, or Firm* — Maginot, Moore & Beck LLP

(57) ABSTRACT

A method for operating a vehicle including a vehicle sensing system includes generating a baseline image model of an cabin of the vehicle based on image data of the cabin of the vehicle generated by an imaging device of the vehicle sensing system, the baseline image model generated before a passenger event, and generating an event image model of the cabin of the vehicle based on image data of the cabin of the vehicle generated by the imaging device, the event image model generated after the passenger event. The method further includes identifying image deviations by comparing the event image model to the baseline image model with a controller of the vehicle sensing system, the image deviations corresponding to differences in the cabin of the vehicle from before the passenger event to after the passenger event, (Continued)

and operating the vehicle based on the identified image deviations.

15 Claims, 9 Drawing Sheets

(51) Int. Cl.
 *G06T 7/73* (2017.01)
 *G06K 9/62* (2022.01)
 *G06T 5/50* (2006.01)
(52) U.S. Cl.
 CPC .............. *G06T 2207/20208* (2013.01); *G06T 2207/30268* (2013.01)
(58) Field of Classification Search
 CPC ........... G06T 2207/30268; G06T 7/254; G06T 5/008; G06T 7/0002
 See application file for complete search history.

(56) References Cited

U.S. PATENT DOCUMENTS

| | | | | |
|---|---|---|---|---|
| 10,127,795 | B1* | 11/2018 | Hwang | H04W 4/023 |
| 2004/0090525 | A1 | 5/2004 | Eichmann | |
| 2006/0008150 | A1 | 1/2006 | Zhao et al. | |
| 2006/0155442 | A1* | 7/2006 | Luo | B60R 21/01538 701/45 |
| 2007/0086624 | A1 | 4/2007 | Breed et al. | |
| 2007/0135979 | A1 | 6/2007 | Plante | |
| 2010/0250052 | A1 | 9/2010 | Ogino | |
| 2016/0034780 | A1 | 2/2016 | Duan et al. | |
| 2016/0249191 | A1* | 8/2016 | Avrahami | H04W 4/12 |
| 2017/0200203 | A1* | 7/2017 | Kingsbury | G06K 9/00771 |
| 2017/0291539 | A1 | 10/2017 | Avery | |
| 2017/0339385 | A1 | 11/2017 | Usui et al. | |
| 2018/0322342 | A1* | 11/2018 | Clifford | G06K 9/00536 |
| 2018/0370496 | A1* | 12/2018 | Sykula | B60S 1/0818 |
| 2019/0197325 | A1* | 6/2019 | Reiley | G08B 21/24 |

FOREIGN PATENT DOCUMENTS

| | | |
|---|---|---|
| GB | 2561062 A | 10/2018 |
| GB | 2563995 A | 1/2019 |
| JP | 2005-115911 A | 4/2005 |
| JP | 2006-338535 A | 12/2006 |

OTHER PUBLICATIONS

Duchêne, S. et al., "Multiview Intrinsic Images of Outdoors Scenes with an Application to Relighting," Association for Computing Machinery (ACM), ACM Transactions on Graphics, vol. 34, No. 5, Article 164, Oct. 2015 (16 pages).

Wikipedia, "High-dynamic-range imaging," retrieved from Internet Feb. 14, 2018, https://en.wikipedia.org/wiki/High-dynamic-range_imaging (10 pages).

Dipert, B. et al., "Improved Vision Processors, Sensors Enable Proliferation of New and Enhanced ADAS Functions," Edge AI + Vision Alliance, Jan. 29, 2014, available at https://www.edge-ai-vision.com/2014/01/improved-vision-processors-sensors-enable-proliferation-of-new-and-enhanced-adas-functions/ (14 pages).

Dipert, B. et al., "Smart In-Vehicle Cameras Increase Driver and Passenger Safety," Edge AI + Vision Alliance, Oct. 3, 2014, available at https://www.edge-ai-vision.com/2014/10/smart-in-vehicle-cameras-increase-driver-and-passenger-safety/ (13 pages).

Mikolajczyk, K. et al., "A Performance Evaluation of Local Descriptors," IEEE Transactions on Pattern Analysis and Machine Intelligence, vol. 27, No. 10, Oct. 2005, pp. 1615-1630 (16 pages).

Tappen, M. F. et al., "Recovering Intrinsic Images from a Single Image," IEEE Transactions on Pattern Analysis and Machine Intelligence, vol. 27, No. 9, Sep. 2005, pp. 1459-1472 (14 pages).

Boykov, Y. et al., "Fast Approximate Energy Minimization via Graph Cuts," IEEE Transactions on Pattern Analysis and Machine Intelligence, vol. 23, No. 11, Nov. 2001, pp. 1-18 (18 pages).

Lin, T.-Y. et al., "Feature Pyramid Networks for Object Detection," IEEE Conference on Computer Vision and Pattern Recognition, 2017, CVPR Open Access (9 pages).

Zhu, Y. et al., "CoupleNet: Coupling Global Structure with Local Parts for Object Detection," IEEE European Conference on Computer Vision, 2017, CVPR Open Access (9 pages).

Bouwmans, T., "Traditional and recent approaches in background modeling for foreground detection: An overview," Computer Science Review, May 2014, vol. 11-12, pp. 31-66 (36 pages).

Chen, T.-L. et al., "Image warping using radial basis functions," Journal of Applied Statistics, 2014, vol. 41, No. 2, pp. 242-258 (17 pages).

Radke, R. J. et al., "Image Change Detection Algorithms: A Systematic Survey," IEEE Transactions on Image Processing, Mar. 2005, vol. 14, No. 3, pp. 294-307 (14 pages).

Alcantarilla, S. et al., "Street-View Change Detection with Deconvolutional Networks," Robotics: Science and Systems, 2016 (10 pages).

Land, E. H. et al., "Lightness and Retinex Theory," Journal of the Optical Society of America (JOSA), Jan. 1971, vol. 61, No. 1, pp. 1-11 (11 pages).

Grosse, R. et al., "Ground truth dataset and baseline evaluations for intrinsic image algorithms," IEEE International, 12th International Conference on Computer Vision (ICCV), 2009, pp. 2335-2342 (8 pages).

Li, Y. et al., "Single Image Layer Separation using Relative Smoothness," IEEE Conference on Computer Vision and Pattern Recognition, 2014, CVPR2014 Open Access (8 pages).

* cited by examiner

METHOD AND SYSTEM FOR VISION-BASED VEHICLE INTERIOR ENVIRONMENT SENSING GUIDED BY VEHICLE PRIOR INFORMATION

This application is a 35 U.S.C. § 371 National Stage Application of PCT/EP2019/056392, filed on Mar. 14, 2019, which claims the benefit of priority of U.S. provisional application Ser. No. 62/649,624, filed on Mar. 29, 2018, the disclosures of which are incorporated herein by reference in their entirety.

FIELD

This disclosure relates generally to the field of video monitoring and, more particularly, to the field of video monitoring of the condition of a passenger cabin of a motor vehicle.

BACKGROUND

Unless otherwise indicated herein, the materials described in this section are not prior art to the claims in this application and are not admitted to the prior art by inclusion in this section.

Vehicles on public motorways are almost exclusively controlled by human operators. As technologies move towards autonomous driving, however, some vehicles on the public motorways will be autonomously controlled by advanced computer systems. Autonomous vehicles are capable of transporting human passengers and do not require a human operator. Instead, the computer system guides the vehicle to a destination selected by the passengers, for example.

A shared autonomous vehicle is an autonomous vehicle that is shared among multiple passengers and provides taxi-like services, for example. Since the shared vehicle is autonomous, a human operator is not present. In such a system, it is typically desirable to monitor the state and the condition of the shared vehicle and to monitor the passengers being transported in order to ensure that the vehicle is in a desired condition and to ensure that the passengers are comfortable.

Numerous attempts have been made to develop systems for monitoring the passengers including face-tracking systems, eye-tracking systems, and systems that track and recognize gestures made by the passengers. Each of these systems attempts to ensure that the passengers are comfortable and are acting appropriately while being transported by the autonomous vehicle. Less attention, however, has been paid to sensing the interior environment within the autonomous vehicle. Consequently, improvements to systems and methods for in-vehicle monitoring would be beneficial.

SUMMARY

According to an exemplary embodiment of the disclosure, a method for operating a vehicle including a vehicle sensing system includes generating a baseline image model of an cabin of the vehicle based on image data of the cabin of the vehicle generated by an imaging device of the vehicle sensing system, the baseline image model generated before a passenger event, and generating an event image model of the cabin of the vehicle based on image data of the cabin of the vehicle generated by the imaging device, the event image model generated after the passenger event. The method further includes identifying image deviations by comparing the event image model to the baseline image model with a controller of the vehicle sensing system, the image deviations corresponding to differences in the cabin of the vehicle from before the passenger event to after the passenger event, and operating the vehicle based on the identified image deviations.

According to another exemplary embodiment of the disclosure, a vehicle sensing system for a corresponding vehicle includes an imaging device, a memory, and a controller. The imaging device is configured to generate image data of a cabin of the vehicle. The memory is configured to store a baseline image model of the cabin of the vehicle that is generated prior to a passenger event. The controller is operably connected to the imaging device and the memory. The controller is configured to generate an event image model of the cabin of the vehicle based on the generated image data after the passenger event. The controller is also configured to identify image deviations by comparing the event image model to the baseline image model, and to operate the vehicle based on the identified image deviations. The image deviations correspond to differences in the cabin of the vehicle from before the passenger event to after the passenger event.

An example use case scenario is illustrated in FIG. 3 in which a passenger rode in a shared autonomous vehicle. Upon exiting the vehicle, the passenger forgot numerous personal belongings on the seats of the vehicle. Such situations present challenges to both human-operated shared vehicles as well as autonomous shared vehicles because at the conclusion of the passenger event a human is not present to inspect the vehicle before the next passenger event.

As another example, a user makes an electronic request for a ride with a shared autonomous vehicle. The passenger, after exiting the vehicle, forgets an item in the vehicle, such as a wallet. According to the disclosure, the vehicle sensing system detects the forgotten object and notifies the passenger via an electronic message to the user, such an email, text message, or voicemail to the passenger. After receiving the notification, the passenger can choose to retrieve the forgotten item.

In another example scenario, when the vehicle sensing system detects that the vehicle seats have become dirty or damaged, the vehicle is automatically sent for maintenance at a service center before the next passenger event.

With these features, as described above, a superior user experience is delivered to the passengers of shared autonomous vehicles as well as shared user-operated vehicles (non-autonomous vehicles).

To achieve these goals, the vehicle sensing system detects events of interest, which are also referred to herein as deviations. In an exemplary embodiment, the detection of events occurs in several different levels. A first example event detected by the vehicle sensing system includes deviations between the car condition after a passenger event and the car condition before the passenger event. The passenger event is a use of the vehicle by a passenger or passengers. The vehicle sensing system identifies a region of the vehicle cabin where the deviations exist, but without any semantic information, such as what type of object has caused the deviation. Typically, lighting changes are not considered as a deviation or an event of interest. A second example event detected by the vehicle sensing system includes information regarding a change in attributes of the vehicle. Exemplary attributes include a position of the seats and a position of other user-adjustable features of the vehicle. The vehicle sensing system also recognizes the causes of the deviation. If the cause of the deviation is the detection of an object, then the system identifies the type of object among a pre-defined set of objects including smartphones, wallets, keys, and the like. If the object cannot be identified, the object is classified as an unknown object. Moreover, the vehicle sensing system detects when the passenger has remained in the vehicle at the end of the passenger event as another exemplary deviation.

An exemplary workflow of the vehicle sensing system to achieve the abovementioned goals includes capturing vehicle interior image data before the passenger event with the vehicle in a baseline condition or a clean condition; capturing of vehicle interior image data after the passenger event, and comparing the pre-passenger event vehicle interior image data and the post-passenger event vehicle interior image data to detect deviations. Exemplary core technologies included in the process are video monitoring systems that perform background subtraction, change detection, image decomposition, and object recognition.

The embodiments of the vehicle sensing system described herein provide improvements to technology that perform automated monitoring and analysis of the interior state of the cabin of a vehicle in a wide range of environmental lighting conditions, which is particularly beneficial for monitoring the interior of a vehicle that moves to different locations with uncontrolled environmental light conditions.

DETAILED DESCRIPTION

Figure 1:
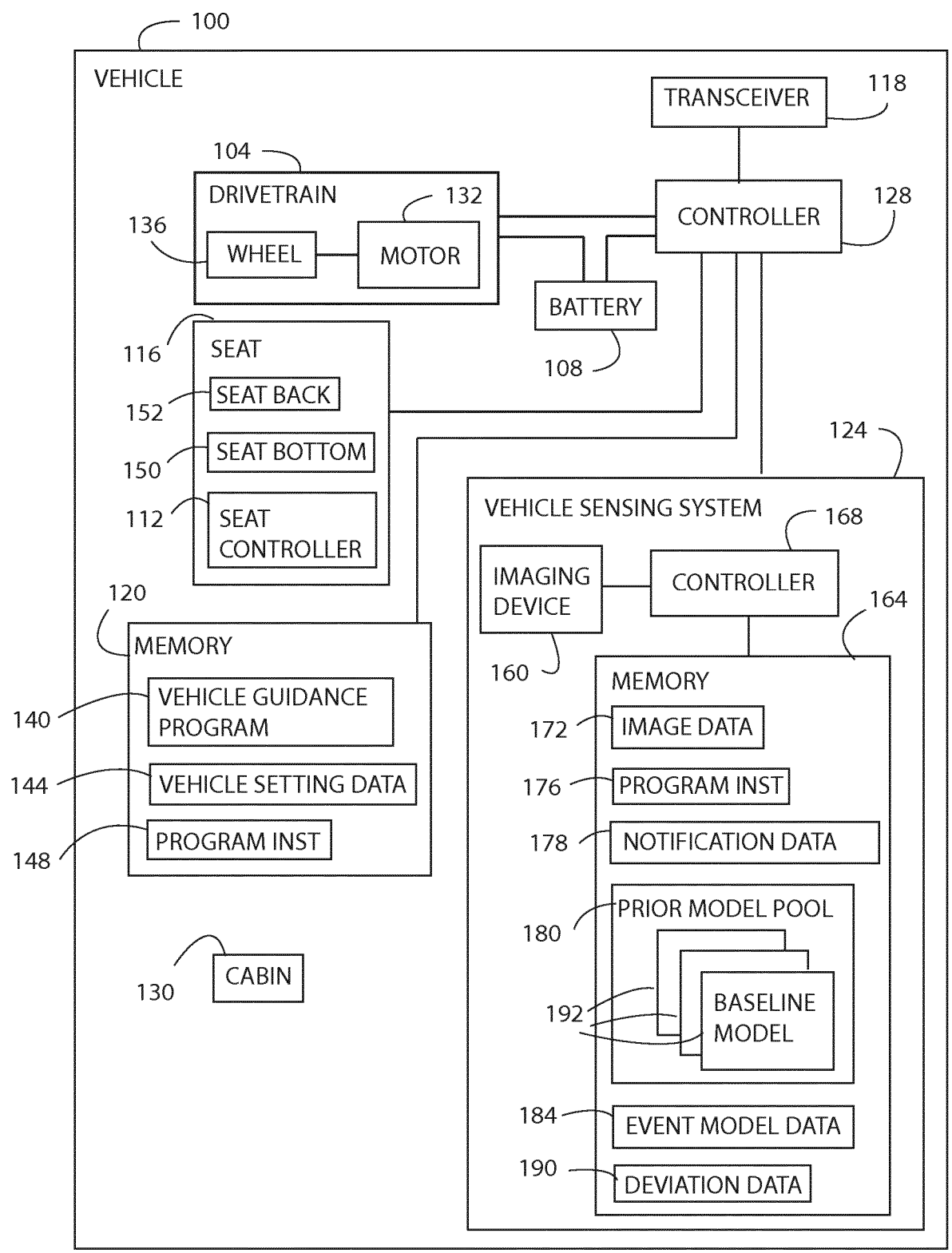
FIG. 1 is a block diagram of a vehicle, as disclosed herein, including a vehicle sensing system.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Aspects of the disclosure are disclosed in the accompanying description. Alternate embodiments of the disclosure and their equivalents may be devised without parting from the spirit or scope of the disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The terms "comprising," "including," "having," and the like, as used with respect to embodiments of the disclosure, are synonymous.

As shown in FIG. 1, an exemplary vehicle 100 includes a drivetrain 104, a battery 108, a seat controller 112 connected to a vehicle seat 116, a transceiver 118, a memory 120, and a vehicle sensing system 124 each operably connected to a controller 128. The vehicle sensing system 128 is configured to monitor a cabin 130 of the vehicle 100 in which at least one passenger is located. The cabin 130 is the interior space of the vehicle 100 that is occupied by passengers and/or occupants of the vehicle 100. The sensing system 124 uses video monitoring of the cabin 130 to enable automated detection of image deviations in the state of the cabin 130, such as when an item or items are unintentionally left in the vehicle 100 or when the vehicle 100 requires maintenance or cleaning. Each element of the vehicle 100 is described herein, as well as an exemplary method of operating the vehicle 100 and the sensing system 124.

The drivetrain 104 is configured to generate a force for moving the vehicle 100. In the exemplary embodiment illustrated in FIG. 1, the drivetrain 104 includes an electric motor 132 operably connected to the battery 108 and to a wheel 136 or wheels of the vehicle 100. The rechargeable battery 108 supplies the electric motor 132 with electrical power for rotating an output shaft (not shown). Rotation of the output shaft of the electric motor 132 causes rotation of the wheel 136, which results in movement of the vehicle 100.

The vehicle 100 is an autonomously-controlled vehicle, and the rotational speed of the electric motor 132 is determined automatically by the controller 128 in response to a vehicle guidance program 140 stored in the memory 120. In another embodiment, the vehicle 100 is controlled by an operator and the rotational speed of the electric motor 132 is determined by the controller 128 in response to inputs from a human operator. In a further embodiment, the motor 132 is an internal combustion engine (ICE) that is either controlled by an operator or the vehicle guidance program 140. In yet another embodiment, vehicle 100 is a hybrid vehicle and the motor 132 includes an electric motor and an ICE that work together to rotate the wheel 136. Accordingly, the vehicle 100 is provided as any type of vehicle including an autonomous vehicle, an operator-controlled vehicle, an electric vehicle, an internal-combustion vehicle, and a hybrid vehicle.

With continued reference to FIG. 1, the transceiver 118 of the vehicle 100, which is also referred to as a wireless transmitter and receiver, is configured to wirelessly transmit data, such as notification data 178, from the vehicle 100 to another electronic device (not shown) and to wirelessly receive data from another electronic device via the Internet, for example. Thus, the transceiver 118 operably connects the vehicle 100 to the Internet and to other electronic devices. In other embodiments, the transceiver 118 sends and receives data using a cellular network, a wireless local area network ("Wi-Fi"), a personal area network, and/or any other wireless network. Accordingly, the transceiver 118 is compatible with any desired wireless communication standard or protocol including, but not limited to, Near Field Communication ("NFC"), IEEE 802.11, IEEE 802.15.1 ("Bluetooth®"), Global System for Mobiles ("GSM"), and Code Division Multiple Access ("CDMA").

The memory 120 is an electronic storage device that is configured to store at least the vehicle guidance program 140, vehicle setting data 144, and program instruction data 148. The memory 120 is also referred to herein as a non-transient computer readable medium.

The seat 116 is configured to support occupants, passengers, users, drivers, and/or operators of the vehicle 100. The seat 116 includes a seat bottom 150 and a seat back 152. The seat controller 112 is configured to change a position of the seat bottom 150 and the seat back 152, so as to accommodate a passenger, for example. Moreover, in some embodiments, in response to a signal from the controller 128, the seat controller 112 resets the position of the seat 116 to a default position after the passenger has exited the vehicle 100 at the conclusion of a passenger event.

Additionally or alternatively, the seat controller 112 is configured to generate the vehicle setting data 144, which includes data corresponding to a current position of the seat 116. Specially, the vehicle setting data 144 includes a front-to-back position of the seat bottom 150 and a tilt position of the seat back 152 relative to the seat bottom 150.

As shown in FIG. 1, the vehicle setting data 144 may also include data corresponding to the setting or position of other configurable elements of the vehicle 100. For example, the vehicle setting data 144 may include window position data corresponding to the position of movable windows of the vehicle 100. The window position data enables the controller 128 to determine if the windows are open, closed, or partially open, for example. The vehicle setting data 144 may also include the configuration of the vehicle doors to indicate when the doors are open or closed.

The controller 128 of the vehicle 100 is configured to execute the program instruction data 148 in order to operate the drivetrain 104, the seat controller 112, the transceiver 118, the memory 120, and the vehicle sensing system 124. The controller 128 is provided as at least one microcontroller and/or microprocessor. In autonomous or semi-autonomous embodiments of the vehicle 100, the controller 128 is configured to execute the vehicle guidance program 140 to guide autonomously the vehicle 100 from an initial location to a desired location using the roadway network. The desired location may be selected by an occupant of the vehicle 100 or by the controller 128. For example, the controller 128 may determine that the vehicle 100 should be moved to a service station, automotive dealer, car wash, or car detailer.

Figure 3:
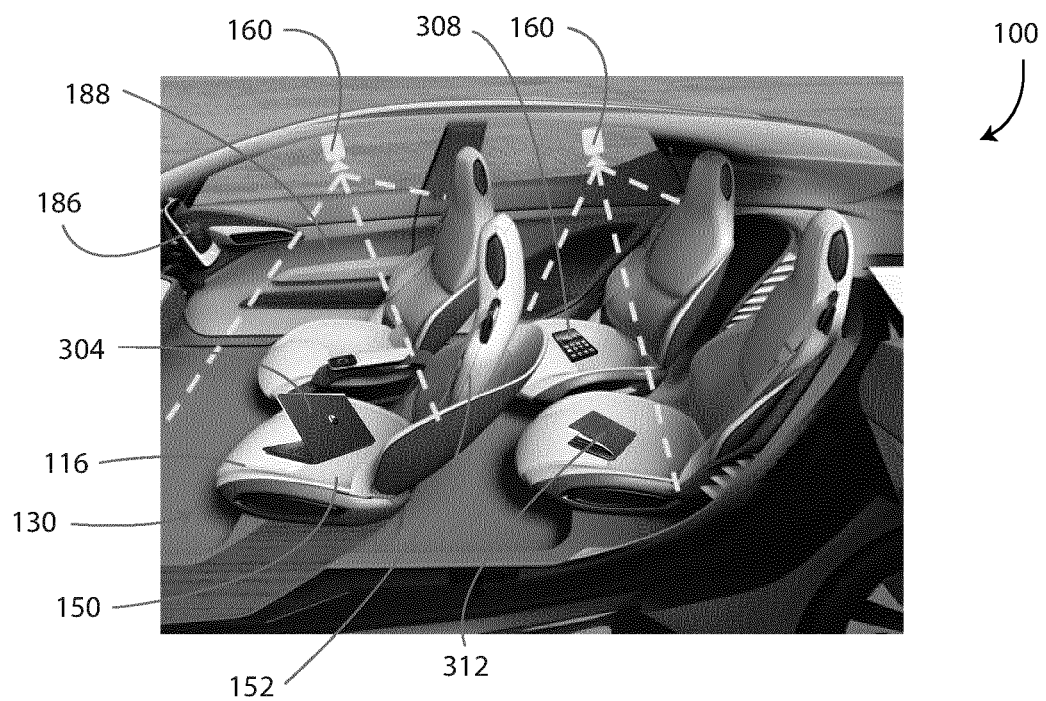
FIG. 3 is a diagram of an exemplary cabin of the vehicle of FIG. 1, the cabin includes three deviations shown as a laptop computer, a wallet, and a smartphone.
Figure 4:
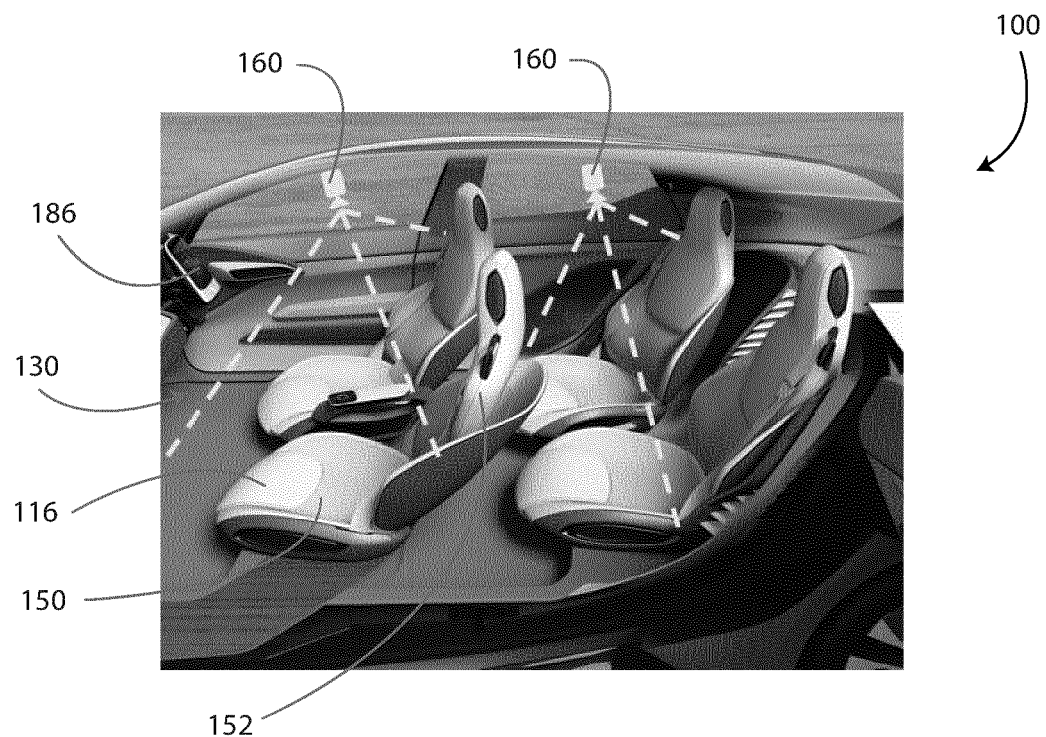
FIG. 4 is another diagram of the cabin of FIG. 3, the cabin is shown in a baseline configuration in which no deviations are present.

With reference to FIG. 1, the vehicle sensing system 124 includes an imaging device 160 and a memory 164 operably connected to another controller 168. The imaging device 160, also referred to herein as a camera, a video camera, and a sensor, is positioned at least partially within the cabin 130 and is configured to generate image data 172 representative of the cabin 130. Specifically, depending on the configuration of the vehicle 100, the imaging device 160 generates image data 172 of a floor of the vehicle 100, the front seats 116, the rear seats 116, a dashboard 186 (FIG. 3), and door panels 188 (FIG. 3) of the vehicle 100. In some embodiments, the sensing system 124 includes only one imaging device 160 that is positioned to generate image data 172 of the entire cabin 130. In other embodiments, the sensing system 124 includes a plurality of the imaging devices 160 that are each assigned to a particular region of the cabin 130. For example, as shown in FIGS. 3 and 4, in a sedan or a two-row crossover vehicle 100, a first imaging device 160 is positioned to generate image data 172 of a front seat region of the vehicle 100, and a second imaging device 160 is positioned to generate image data 172 of a rear seat region of the vehicle 100. In a passenger van, minivan, or other vehicle 100 having three or more rows of seats, each row of seats may include a corresponding imaging device 160. In yet another embodiment, each seat 116 of the vehicle 100 is monitored by an individual imaging device 160 that only monitors the one seat 116. The imaging device 160 may be configured as a red, green, blue, and depth sensor (i.e. an "RGB-D sensor"), an inertial measurement unit ("IMU"), a thermal camera, an infrared camera, and/or a visible light camera. The image data 172 is transmitted from the imaging device 160 to the controller 168 and is stored in the memory 164.

The memory 164 is an electronic storage device that is configured to store at least the image data 172, program instructions 176 for operating the vehicle sensing system 124, the notification data 178, a prior model pool 180, an event image model 184 of the cabin 130, and deviation data 190. The memory 164 is also referred to herein as a non-transient computer readable medium.

As shown in FIG. 1, the notification data 178 includes information generated by the vehicle sensing system 124. For example, the notification data 178 includes information regarding objects left in the cabin 130 after a passenger event. In one embodiment, the notification data 178 includes the name or identification of the passenger and the type of object left behind, such as a smartphone. The notification data 178 also includes information regarding the cleanliness of the cabin 130. For example, the notification data 178 includes information that one of the front seats 116 is dirty and that the other seats 116 are clean. The notification data 178 may also include information corresponding to the vehicle setting data 114, such as the configuration of the seats 116 and the windows of the vehicle 100. The notification data 178 may also include information that the passenger did not leave any objects behind, that the vehicle 100 is clean, and that the vehicle 100 is ready for subsequent passenger event.

The prior model pool 180 includes a plurality baseline image models 192, which corresponds to the cabin 130 in different conditions and configurations. The baseline image models 192 are electronic data models of the cabin 130 in a clean condition without any passengers or passenger belongings (i.e. items), such as smartphones, located in the cabin 130 (as shown in FIG. 4). The sensing system 124 is configured to select at least one of the baseline image models 192 of the prior model pool 180 for comparison to the event image model data 184 in order to identify the image deviations of the deviation data 190. In an exemplary embodiment, the prior model pool 180 includes baseline image models 192 for multiple positions of the seats 116 and other configurable or positionable elements of the vehicle 100. Specifically, the baseline image models 192 are associated with corresponding vehicle setting data 144. In at least one embodiment, at least some baseline image models 192 are generated using an HDR process and include at least one HDR image of the cabin 130.

The event image model data 184 is generated by the controller 168 and is based on image data 172 from the imaging device 160 after a passenger event. The event image model data 184, therefore, may include passengers and/or passenger belongings, such as smartphones. In at least one embodiment, the event image model data 184 is generated using an HDR process and includes at least one HDR image of the cabin 130. The at least one HDR image of the cabin 130 is configured to reduce an impact of environmental lighting on the generation of the event image model 184 of the cabin 130.

The deviation data 190 is generated by the controller 168 and is based on a comparison of a selected one of the baseline image models 192 and the event image model data 184 after a passenger event has occurred. The sensing system 124 identifies the deviation data 190 as differences between the baseline image model 192 and the event image model data 184. The identified differences of the deviation data 190 typically correspond to one or more passengers, one or more objects or personal belongings left behind by the passenger, damage to the cabin 130, and soiled areas of the cabin 130. The controller 168 processes the deviation data 190 with an objection detection algorithm to identify the specific type of objects left behind by the passenger. In this way, the sensing system 124 is configured to identify that an object was left behind by the passenger and then identify that object as being a smartphone, for example. The image deviations of the deviation data 190 are also referred to herein as events of interest.

The controller 168 of the vehicle sensing system 124 is configured to execute the program instruction data 176 in order to operate the sensing system 124. The controller 168 is provided as at least one microcontroller and/or microprocessor.

Figure 2:
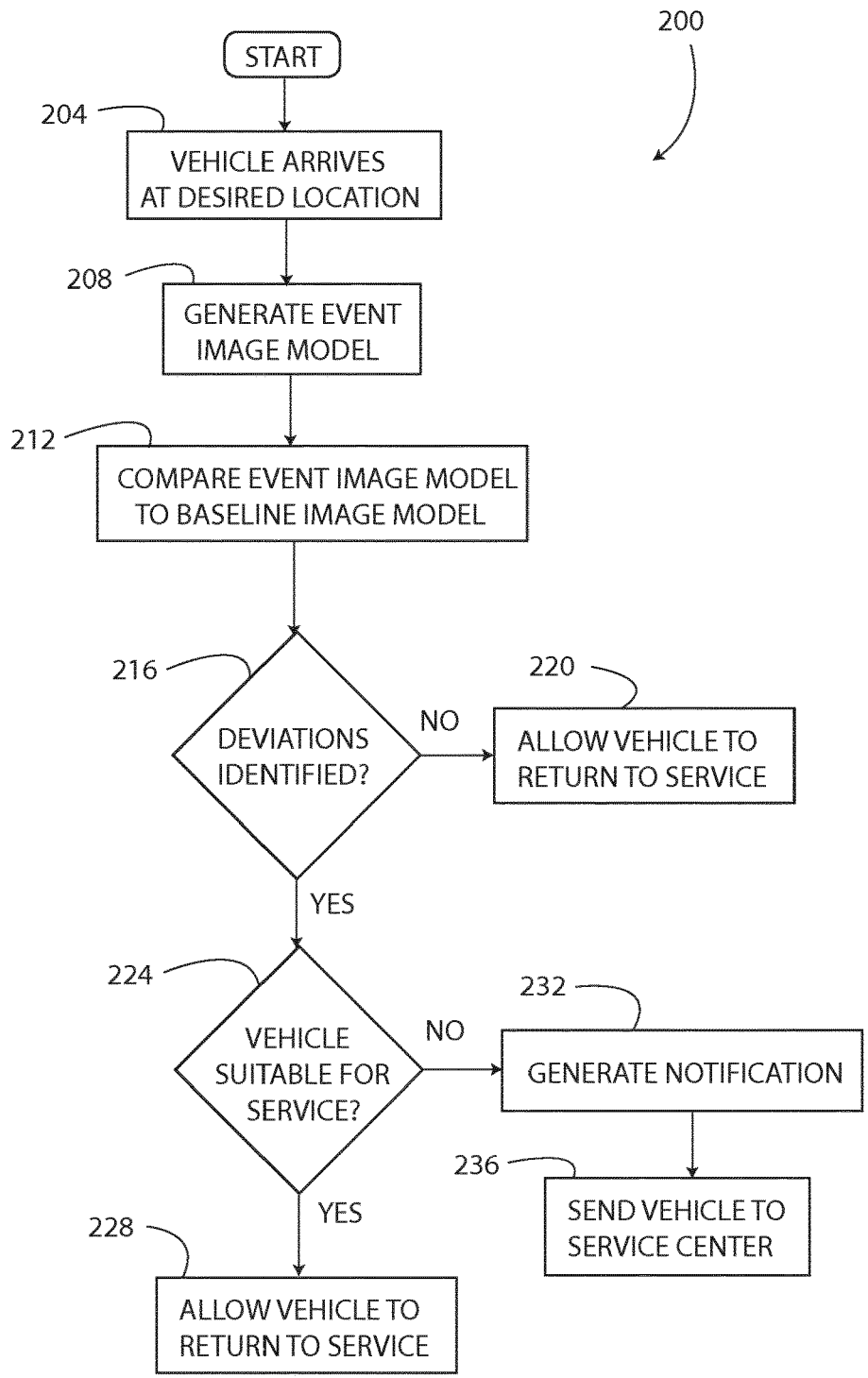
FIG. 2 is a flowchart depicting an exemplary method of operating the vehicle and the vehicle sensing system of FIG. 1.

In operation, the vehicle 100 is configured to implement a method 200 illustrated by the flowchart of FIG. 2. In this exemplary embodiment, the vehicle 100 is a shared autonomous vehicle that is configured to drive autonomously to the location of a user/passenger, then upon the passenger entering the vehicle 100, transport autonomously the passenger to a desired location using the public roadway network. The vehicle 100 is engaged in a passenger event when the vehicle 100 is traveling to the pickup location of a passenger and when the vehicle 100 is transporting the passenger to the desired location. The vehicle 100 completes a passenger event when the passenger is transported to the desired location and all passengers exit the vehicle 100. The vehicle 100 typically drives autonomously to another destination after transporting the passenger to the desired location. The passenger may engage the services of the vehicle 100 using a smartphone application, for example. The passenger is also referred to herein as a user.

In block 204 of the method 200, the vehicle 100 has transported the passenger to the desired location. Typically, when the passenger arrives at the desired location, the passenger removes all of the personal belongings, such as electronic devices, smartphones, wallets, sunglasses, keys, and the like from the vehicle 100, to prevent theft or loss of the personal items. Some passengers, as shown in FIG. 3, may forget to remove their personal belongings and leave them in the cabin 130 as the vehicle 100 drives autonomously away from the desired location. Such is a problem for the passenger because it may be difficult to track down the vehicle 100 and retrieve the belongings. Moreover, while most passengers will leave the vehicle 100 in a clean condition, some passengers may dirty the cabin 130, thereby making the cabin 130 unfit to carry subsequent passengers. The sensing system 124 implements the method 200 to prevent subsequent passengers of the vehicle 100 from being inconvenienced by these problems.

In the example of FIG. 3, the passenger has left behind numerous personal belongings including a laptop computer 304, a smartphone 308, and a wallet 312. After arriving at the desired location, the sensing system 124 activates to determine if the vehicle 100 is in a suitable condition for another passenger event. In one embodiment, the method 200 includes activating the sensing system 124 when the vehicle 100 detects that the passenger(s) has exited the vehicle 100. The vehicle 100 detects that the passenger has exited the vehicle 100 by monitoring the vehicle setting data 144 corresponding to the opening and the closing of the doors. Additionally or alternatively, the vehicle 100 detects the presence or absence of passengers with sensors in the seats 116, such as weight sensors. Any other method may be used to determine that the passenger(s) has exited the vehicle 100 at the conclusion of the passenger event.

In block 208 of the method 200, the vehicle sensing system 124 generates the event image model data 184. The event image model data 184 is generated after the passenger exits the vehicle 100 at the conclusion of the passenger event and before a different passenger enters the vehicle 100 during a subsequent passenger event. In this example, the event image model data 184 is generated based on the vehicle 100 of FIG. 3 and includes image data corresponding to the laptop computer 304, the smartphone 308, the wallet 312, and the rest of the cabin 130. As shown in FIG. 3, the sensing system 124 includes a front zone imaging device 160 and a rear zone imaging device 160. Each imaging device 160 generates image data 172 corresponding to at least a portion of the cabin 130 including, for example, the seat bottoms 150, the seat backs 152, the floor of the vehicle 100, and other areas at which passengers typically place personal belongings. The controller 128 processes the image data 172 from both imaging devices 160 and stores the event image model data 184 in the memory 164. The event image model data 184 is specific to one of the passenger events and may be linked to the name or the account of the passenger(s) that was transported. Moreover, in at least some embodiments, the controller 168 is configured to associate the current vehicle setting data 144 with the event image model data 184 to aid in the selection of one of the baseline image models 192.

Next, in block 212 of the method 200, the vehicle sensing system 124 compares the event image model data 184 to a selected one of the baseline image models 192, which is selected from the prior model pool 180. The baseline image models 192 of the prior model pool 180 are generated by the sensing system 124 with the cabin 130 in a baseline state, as shown in FIG. 4, which is also referred to herein as a default state or a clean state. In the baseline state there are no personal belongings in the cabin 130, and the cabin 130 is in a clean condition.

Each baseline image model 192 corresponds to a particular configuration of the vehicle 100 based on the vehicle setting data 144. For example, a first baseline image model 192 is generated with the seat backs 152 in an upright position, and a second baseline image model 192 that is generated with the seat backs 152 in a reclined or tilted position. The vehicle setting data 144 is associated with the baseline image models 192 so that a particular baseline image model 192 can be located and selected based on the present configuration of the vehicle 100 according to the vehicle setting data 144.

In one embodiment, the method 200 includes selecting an optimal baseline image model 192 from the prior model pool 180 by comparing the vehicle setting data 144 associated with the event image model data 184 to the vehicle setting data 144 associated with each of the baseline image models 192. The baseline image model 192 having vehicle setting data 144 that corresponds most closely to the vehicle setting data 144 of the event image model data 184 is selected as the optimal baseline image model 192.

Next, in block 212 of the method 200, the sensing system 124 compares the event image model data 184 to the selected baseline image model 192 to generate the deviation data 190. By comparing the models 184, 192, the sensing system 124 identifies visual differences between the baseline image model 192 and the event image model data 184. These visual differences typically correspond to belongings left behind by the passenger and soiled regions of the cabin 130. The visual differences between the baseline image model 192 and the event image model 184 are referred to herein as "image deviations" or "deviations" because the visual differences are a deviation from the clean/empty state of the cabin 130 from before the passenger event to after the passenger event. The deviations are stored in the memory 164 as the deviation data 190.

If at block 216 the sensing system 124 does not identify any deviations in comparing the event image model 184 to the baseline image model 192, then at block 220 the vehicle 100 is returned to service and is ready for another passenger event. Accordingly, at block 220, the sensing system 124 has determined that the vehicle 100 is free from personal belongings of the passenger, is reasonably clean, and is in a condition suitable for the next passenger. The sensing system 124 has made these determinations without human involvement and has efficiently improved the user experience of the vehicle 100.

At block 224 of the method 200, the sensing system 124 has identified deviations (in block 216) and determines if the vehicle 100 is suitable for service. Specifically, the sensing system 124 uses an object recognition system to classify the deviations of the deviation data 190. For example, considering again FIG. 3, the sensing system 124 processes the deviation data 190 with the object recognition system to determine that the deviations correspond to the laptop computer 304, the smartphone 308, and the wallet 312. Thus, the sensing system 124 has identified an item located in the cabin 130 after the passenger event that was not located in the cabin 130 before the passenger event. To this end, the sensing system 124 may include a database of object data against which the deviation data 190 is processed to identify the specific types of objects that are present in the cabin 130. Any other object recognition method or image processing algorithm may be used by the sensing system 124 to identify and to classify the deviations present in the deviation data 190.

Next at block 224 of the method 200, the sensing system 124 determines if, in spite of the identified deviations, the vehicle 100 is in a condition suitable to return to service. The sensing system 124 makes this determination by evaluating the type of deviations that have been identified. For example, if the sensing system 124 has determined that the deviations correspond to a cabin 130 that is unacceptably dirty or soiled, then the vehicle 100 is not returned to service. If, however, the sensing system 124 has determined that the deviations correspond to a cabin 130 is only moderately dirty or soiled, then the vehicle 100 is returned to service for additional passenger events.

At block 228 of the method 200, the vehicle 100 returns to service and is available for further passenger events. Typically, the event image model data 184 is saved for predetermined time period after the passenger event. Thus, in at least this manner the vehicle 100 is operated based on the identified image deviations.

If, at block 224 of the method, the sensing system 124 determines that vehicle 100 is unsuitable to return to service, then a different approach is taken. Specifically, in such an example, at block 232 the sensing system 124 generates the notification data 178. The notification data 178 is sent to the passenger and/or the service station. For example, the notification data 178 may inform the passenger that certain personal belongings were left behind in the cabin 130. The notification data 178 may identify the belongings that were left behind and include instructions for the passenger to retrieve the belongings. Moreover, in this example, the notification data 178 is sent to a service center to alert the service center that the vehicle 100 will be shortly arriving and is in need of a cleaning and/or personal belongings will need to be removed. The notification data 178 is sent from the vehicle 100 to the passenger and the service center using the transceiver 118 of the vehicle 100. Generating the notification data 178 corresponds to operating the vehicle 100 based on the identified image deviations.

At block 236 of the method 200, the vehicle 100 autonomously returns to a service center. In this example, the vehicle sensing system 124 has identified that the previous passenger(s) has left behind many personal belongings (shown in FIG. 3). Thus, in order to prevent theft of the passenger's belongings and an uncomfortable ride for the next passenger, the vehicle 100 is returned to the service center so that the cabin 130 can be emptied and/or cleaned. Thus, in at least this manner the vehicle 100 is operated based on the identified image deviations.

The vehicle 100 and the sensing system 124 are an improvement over the prior art, because the sensing system 124 solves the problem of determining the condition of a shared autonomous vehicle 100, when the autonomous vehicle 100 is away from a base station or service center. In the past, a human inspector was required to determine when the vehicle is dirty or when personal belongings were left behind. The sensing system 124 automates this task and offers certain additional benefits. For example, when the sensing system 124 evaluates the condition of the cabin 130 after each passenger event, the sensing system 124 can identify a specific passenger that left behind the personal items or has soiled the cabin 130. Thus, the sensing system 130 can prevent loss of items of the passengers by returning the vehicle 100 to a service station to enable the passenger to retrieve the items. Moreover, the sensing system 124 can prevent losses to the owners of the vehicle 100 by identifying the passengers that have soiled and/or damaged the cabin 130.

Additional aspects of the vehicle 100 and the vehicle sensing system 124 are described below.

Figure 5:
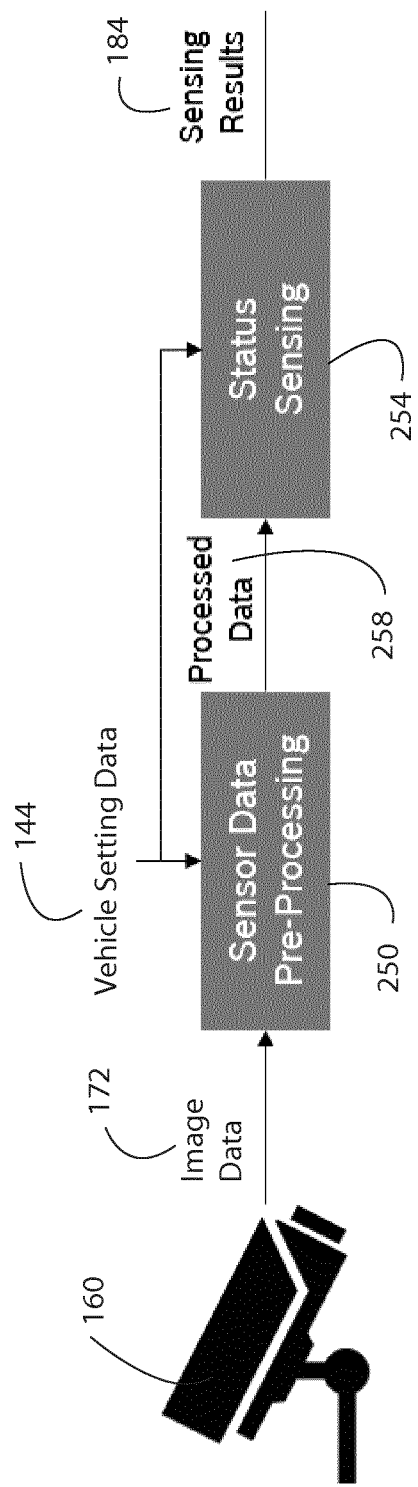
FIG. 5 is a diagram illustrating processing modules of the vehicle sensing system of FIG. 1 including a sensor data pre-processing module.

FIG. 5 depicts exemplary processing modules of the sensing system 124 including a sensor data pre-processing module 250 and a status sensing module 254. The pre-processing module 250 takes two inputs: the image data 172 and the vehicle setting data 144 to generate processed data 258. The status sensing module 254 then takes the processed data 258 and, in some embodiments, the vehicle setting data 144 to generate the sensing results, which are stored in the memory 164 as part of the event image model data 184.

Figure 6:
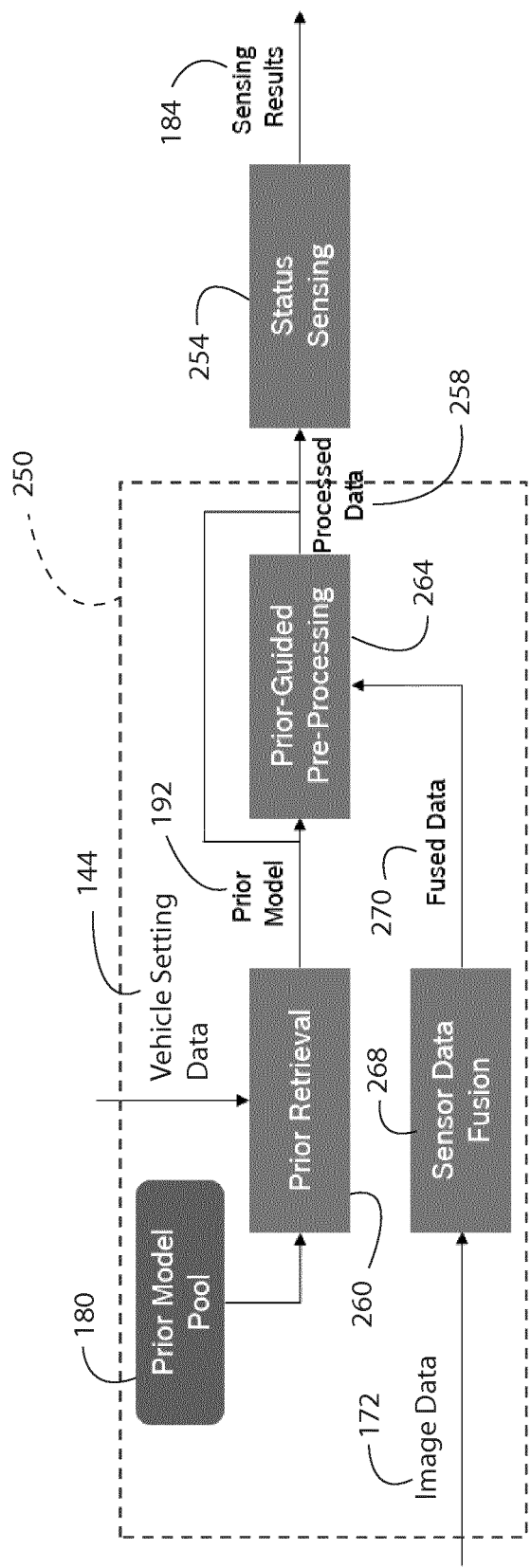
FIG. 6 is a diagram illustrating the sensor data pre-processing module of FIG. 5.

FIG. 6 depicts an embodiment of the sensor pre-processing module 250 of FIG. 5. The sensor pre-processing module 250 includes three processing sub-modules 260, 264, 268. The sensor pre-processing module 250 of FIG. 6 operates as follows. First, the prior retrieval module 260 receives the vehicle setting data 144 as a reference and identifies a corresponding baseline image model 192 from the prior model pool 180. The sensor data fusion module 268 takes the image data 172 as an input and generates fused data 270. The prior-guided pre-processing module 264 takes the selected baseline image model 192 and the fused data 270 as inputs and generates the processed data 258, which is provided to the status sensing module 254.

Figure 7:
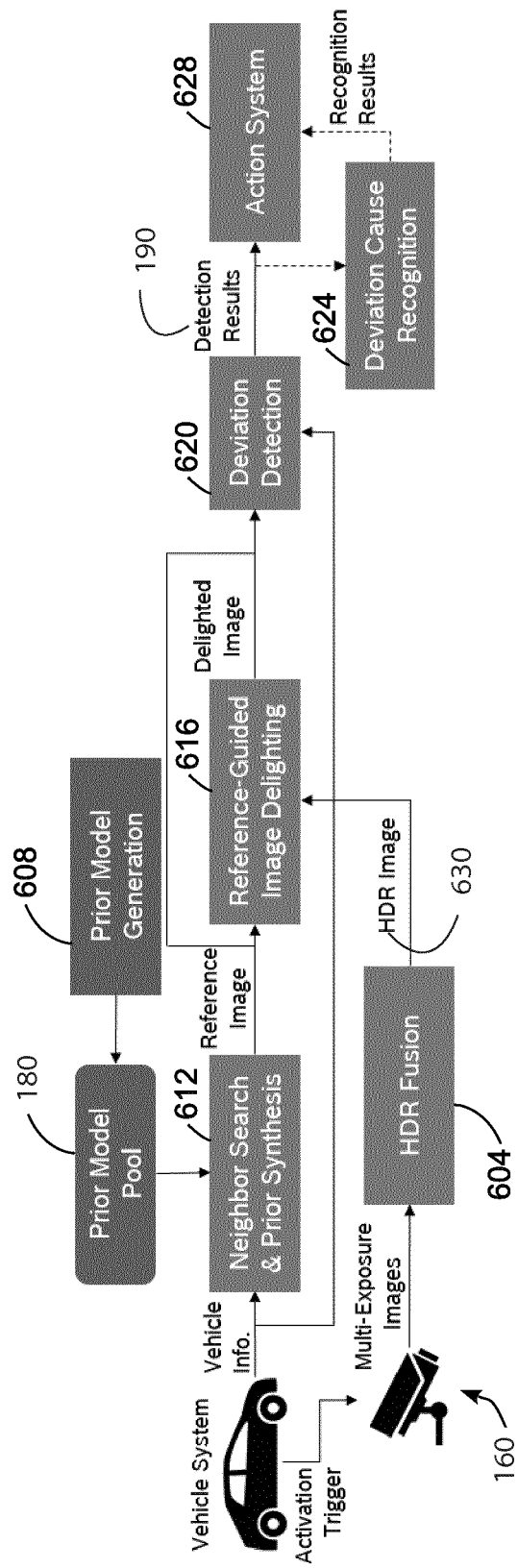
FIG. 7 is a diagram of the vehicle and processing modules of the vehicle sensing system of FIG. 1.

FIG. 7 depicts the vehicle 100 and an exemplary implementation of the sensing system 124. The dashed lines in FIG. 7 indicate optional process flows that can be switched on or off as desired by the sensing system 124. The sensing system 124 uses an imaging device 160 that includes a fisheye lens so that the imaging device 160 has a wide field of view. The sensing system 124 determines when the system 124 should be activated. When the activated, the controller 168 triggers the imaging device 160 to start generating the image data 172, and triggers the seat controller 112 to generate the vehicle setting data 144 including, for example, the position and tilt angle of the seat backs 152.

Next, the neighbor search & prior synthesis module 612, which is an implementation of the prior retrieval module 260 (FIG. 6), receives the vehicle setting data 144 and selects a reference image based on the prior model pool 180. Meanwhile, the imaging device 160 captures a set of images with different exposures of the same scene of the cabin 130. The vehicle 100 typically remains stationary during this imaging process. The HDR fusion module 604, which is an implementation of the sensor data fusion module 268 (FIG. 6), generates a high dynamic range (HDR) image from the set of multi-exposure images of the image data 172.

With continued reference to FIG. 7, the reference-guided image de-lighting module 616, which is an implementation of the prior-guided pre-processing module 264 (FIG. 6), processes the HDR image of the image data 172 to remove strong lighting effects from the image using the reference image as guidance. The output is a de-lighted image.

The deviation detection module 620, which is a portion of an implementation of the status sensing module 254 (FIG. 6), compares the de-lighted image against the baseline image model 192 and identifies the regions in the image where significant deviations exist. These deviations are stored as the deviation data 190 (i.e. detection results or events of interest). If semantic information is desired, the deviation detection module 620 causes the recognition module 624, which is another portion of an implementation of the status sensing module 254 (FIG. 6), to take the detection results as an input and to identify a reason for the detected deviation. Exemplary reasons for the detected deviation include the presence of a smartphone 308 in the cabin 130 and/or a dirty area (not shown) on the seat 116, among other reasons. The action system 628 then takes proper action, such as notifying the passenger based on the detection results via the notification data 178.

In some embodiments, there is an offline stage prior model generation module 608 which is configured to construct the prior model pool 180. The prior model pool 180 is generated and stored in the memory 164 prior to placing the vehicle 100 into service. The prior model pool 180 includes a plurality of baseline image models 192 for the expected configurations of the seats 116 and other moveable objects within the cabin 130.

With continued reference to FIG. 7, the HDR fusion module 604 includes, for example, one or more digital signal processors, graphics processing units (GPUs), or other suitable digital processing devices that receive multiple images generated by the imaging device 160 within a short time period that are each generated with a different exposure level. The HDR fusion module 604 generates a single high dynamic range (HDR) image 630 from the multiple images received from the imaging device 160. A purpose of generating the HDR image 630 is to overcome the drawback of limited dynamic range of the typical imaging device 160, and to capture sufficient amount of details in both dark and light regions of the cabin 130, as illustrated in the examples shown in FIGS. 8A, 8B, 8C, 8D.

Figure 8A:
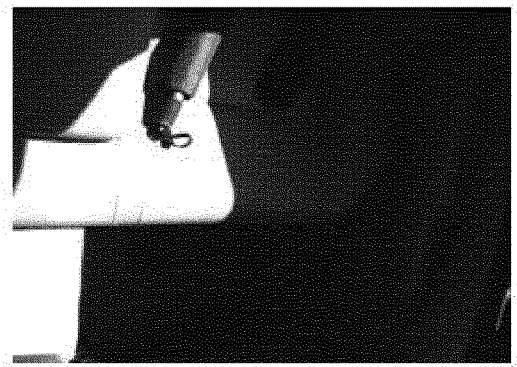
FIG. 8A depicts image data generated by an imaging device of the vehicle sensing system of FIG. 1 that is produced with the cabin in strong sunlight.
Figure 8B:
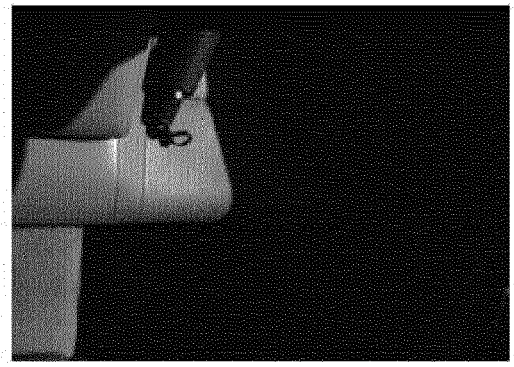
FIG. 8B depicts image data generated by the imaging device of the vehicle sensing system of FIG. 1, the image data is a stop from a multi-exposure set and has a short exposure.
Figure 8C:
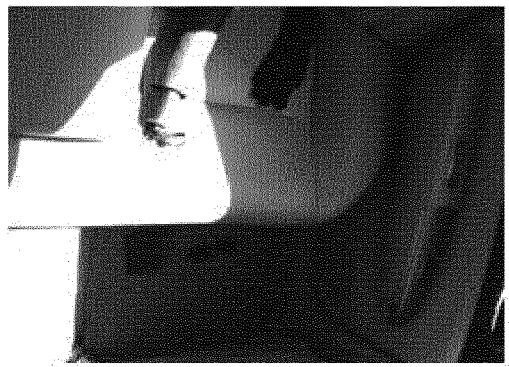
FIG. 8C depicts image data generated by the imaging device of the vehicle sensing system of FIG. 1, the image data is a stop from a multi-exposure set and has a long exposure.
Figure 8D:
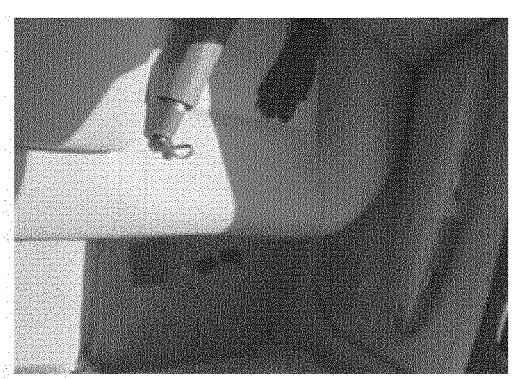
FIG. 8D depicts image data generated by the imaging device of the vehicle sensing system of FIG. 1, the image data is a high dynamic range (HDR) image based on a combination of the images shown in FIGS. 8A, 8B, and 8C.

The HDR image 630 is particularly useful in a vehicle 100 that is photographed at different times of day and at different locations where the external lighting (e.g. sun, moon, streetlights, etc.) cannot be controlled. A typical scenario when the vehicle 100 is in the outdoor environment is strong sunlight illuminating the passenger seat 116. With the typical auto-exposure setting of an imaging device 160, the captured image will look very similar to FIG. 8A, where the bright areas are over-exposed and the dark areas are under-exposed, leading to loss of information in both areas. In the sensing system 124, the imaging device 160 captures a set of images under different exposures ranging from low values to high values. As the example in FIGS. 8B and 8C show, the short-exposure image (FIG. 8B) captures details on the bright area, while the long-exposure image (FIG. 8C) contains details on the dark area. The HDR Fusion module 604 combines the information from this set of images to generate the HDR image 630, which includes details in both areas, as shown in FIG. 8D.

In the system of FIG. 7, the prior model generation module 608 produces the prior model pool 180 based on captured images of the cabin 130 under varying, predetermined configurations. The prior model generation module 608 is, for example, a computing device that is either incorporated into the vehicle 100 or an external computing device (not shown) that produces the prior model pool 180 for an entire fleet of the vehicles 100 that all share the same interior configuration.

Figure 9:
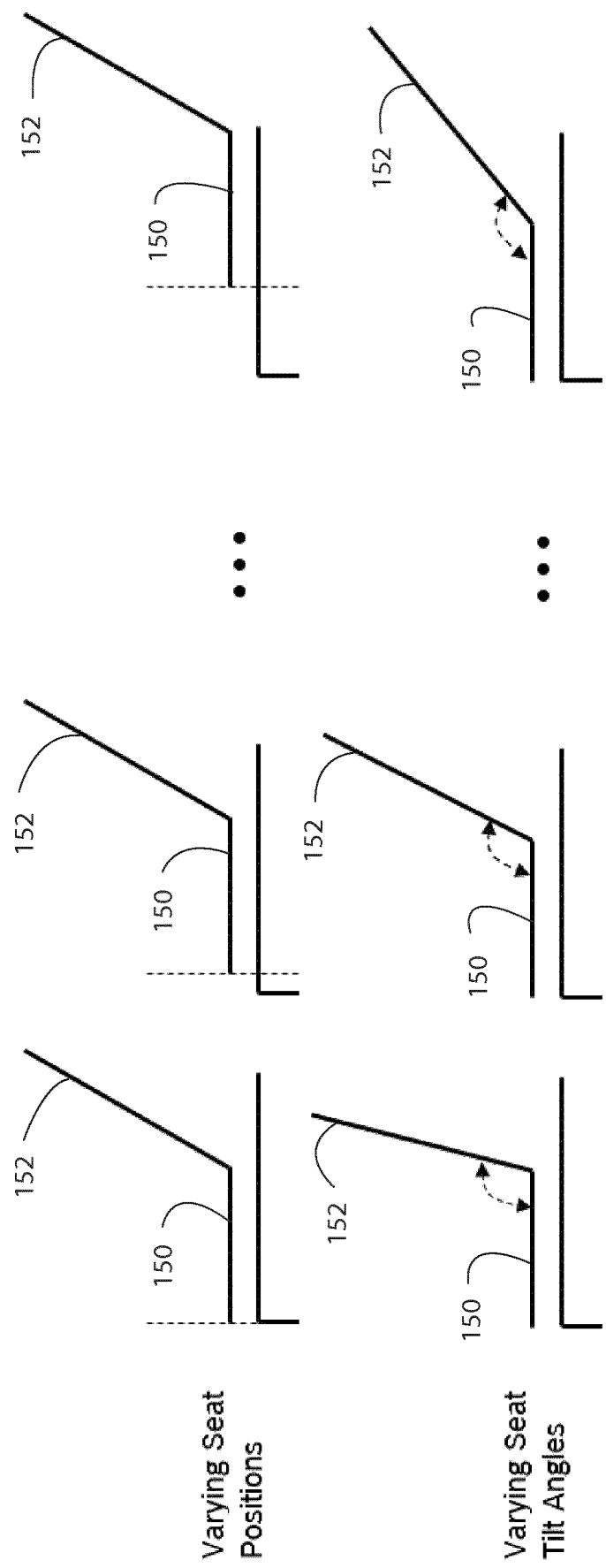
FIG. 9 is an illustration of different seat configurations of the seats of the vehicle of FIG. 1.

FIG. 9 depicts an example of the configurations of the seat 116 within the cabin 130. In one implementation, the prior model pool 180 also includes HDR images 630 of the cabin 130 in a clean condition without any external objects and under uniform lighting without strong sunlight. Each baseline image model 192 of the prior model pool 180 is generated when the seats 116 and other movable objects in the vehicle 100 are in predetermined locations as indicated by the vehicle setting data 144.

To generate the prior model pool 180, the system 124 captures the baseline image models 192 under multiple configurations of the movable parts of the vehicle 100. However, the number of different configurations is typically huge and it is typically infeasible to capture all possible variations. In such case, the sensing system 124 performs a sub-sampling for certain adjustable parts of the vehicle 100. For example, the prior model pool 180 is built with baseline image models 192 of the seat 116 in only a selected set of seat positions in order to reduce the dimensionality. The neighbor search and prior synthesis module 612 synthesizes the prior model pool 180 based on these samples. If some attributes of the deviation (e.g., size and location) are desired by the system 124, the relevant attribute information can be included in the prior model pool 180. For example, in the captured HDR images 630, regions for each passenger seat 116 can be marked and the size can be specified. Such information can be directly used in the deviation detection module 620 to provide the desired attribute information. The prior model pool 180 also includes a 3D model of the cabin 130, for example.

The neighbor search and prior synthesis module 612 of the sensing system 124 is implemented using at least one processor that searches the prior model pool 180 to identify one of the baseline image models 192 that most closely corresponds to the current configuration of the seats 116 and other elements within the cabin 130 based on the vehicle setting data 144. One embodiment of a neighbor search is a brute force search process that compares the current configuration and the configurations in the prior model pool 180. The module 612 generates a distance metric via a weighted sum between the distances in each dimension of comparison. For example, assuming the seat position value of the vehicle setting data 144 is denoted as p and the tilt angle of the seat back 152 is denoted as θ, the metric can be defined as: $w_p|p-p_c|+w_\theta|\theta-\theta_c|$ where the subscript c means the current configuration and the terms $w_p$, $w_\theta$ leverage the relative importance of each dimension.

In the case where the prior model pool 180 contains a large amount of data, a fast search algorithm can be used, such as KD-Tree. As an example, a KD-Tree can be constructed from the prior model pool 180 using the following data: $[w_p p, w_\theta \theta]$. Upon construction of the KD-Tree, the module 612 performs a fast search of the KD-Tree to identify the nearest neighbor (i.e. the selected baseline image model 192).

As previously mentioned, the prior model pool 180 typically contains data from only a subset of the possible configurations of the adjustable vehicle components. In this case, a prior synthesis step adapts the identified neighboring model (i.e. the selected baseline image model 192) in the model pool 180 to the current configuration of the vehicle 100. When the prior model pool 180 includes HDR images 630, image warping can be performed to achieve this goal. The basic assumption is that the configuration of the selected baseline image model 192 is close to the current configuration as determined from the vehicle setting data 144. Therefore, the difference between the selected baseline image model 192 and the synthesis target is small. To compensate for this small difference, interest points can be detected and matched between the selected baseline image model 192 (i.e. a neighbor image) and the configuration corresponding to the event image model data 184 (i.e. a current image). Based on that, the neighbor image can be warped towards the current image, e.g., based on radial basis functions. In this case, the warped image will be the output prior data from the module 612.

The inputs to the de-lighting module 616 include the reference image $I_A$ of a clean scene (i.e. selected baseline image model 192) and the HDR image $I_B$ of the current scene (i.e. event image model data 184). The goal of the module 616 is to perform an image decomposition de-lighting process to decompose $I_B$ into two layers including a reflectance layer $R_B$ that contains the scene appearance with the same lighting as $I_A$; and a shading layer $S_B$ that contains only the lighting information. The product of these two layers will recover the original image based on the following equation:

$$I_B = S_B \cdot R_B$$

The embodiments described herein use the reference image $I_A$ as a guide to develop an iterative procedure for the decomposition. The computing is done in log scale of the image. The equations below denote the log-scaled images with superscript L. The relationship among these images can be described using the following equations:

$$I_A^L = \log(I_A)$$

$$I_B^L = \log(I_B)$$

$$S_B^L = \log(S_B)$$

$$R_B^L = \log(R_B)$$

$$I_B^L = S_B^L + R_B^L$$

The procedure to perform de-lighting process using the module 616 uses the following process: Inputs: $I_A^L$, $I_B^L$, $M^0$ that begins with an estimated $\hat{M}=M^0$ and iterates until the estimate $\hat{M}$ converges to a final estimate based on the following process. Inputs: $I_A^L$, $I_B^L$, $M^0$, where $M^0$ is an initial estimate $\hat{M}=M^0$ and the process iterates until $\hat{M}$ converges to a final estimate. Guided decomposition through an optimization: Inputs: $I_A^L$, $I_B^L$, $\hat{M}$, and Outputs: $\hat{R}_B^L$, $\hat{S}_B^L$. Segmentation to identify the regions where significant deviations between $I_A$ and $I_B$ exist: Inputs: $I_A^L$, $\hat{R}_B^L$, and Output: $\hat{M}$. Outputs: $M=\hat{M}$, $R_B^L=\hat{R}_B^L$, $S_B^L=\hat{S}_B^L$.

In the process described above, M is a binary mask indicating the significant deviations between $I_A$ and $I_B$. $M^0$ is an initialization of M, while $\hat{M}$ is the intermediate estimation of M during the iterations. $\hat{R}_B^L$ and $\hat{S}_B^L$ are the intermediate estimations of $R_B^L$ and $S_B^L$ during the iterations. In more detail, the guided decomposition process minimizes the following energy function to solve for $\hat{R}_B^L$ and $\hat{S}_B^L$ $$E_D = E_g + \lambda_s E_s + \lambda_r E_r$$

under the constraint: $\hat{R}_B^L + \hat{S}_B^L = I_B^L$.

The weights $\lambda_s$ and $\lambda_r$ leverage the relative importance of each individual team in the function. Each term is explained in more details in the following paragraphs.

The term $E_g$ is a gradient term that minimizes the difference between the gradient of $\hat{R}_B^L$ against some reference gradient fields $\{G_x, G_y\}$, such as:

$$E_g = (\nabla_x \hat{R}_B^L - G_x)^T W_x^g (\nabla_x \hat{R}_B^L - G_x) + (\nabla_y \hat{R}_B^L - G_y)^T W_y^g (\nabla_y \hat{R}_B^L - G_y)$$

where $\nabla_x$ and $\nabla_y$ are gradient operators in x and y directions, respectively. In one implementation, the gradient field is the image gradient of $I_B^L$ assuming the gradients in $I_B$ mostly originate from the reflectance layer. In this case, $\{G_x, G_y\}$ are defined as $$G_x = \nabla_x I_B^L; G_y = \nabla_y I_B^L.$$

More sophisticated methods can be used to assign different weights to the pixels. For example, classifiers can be used to recognize if an edge should belong to the reflectance layer or the shading layer. Based on that, higher values can be used for edges classified as reflectance edges.

The term $E_s$ is a shading smoothness term that enforces smoothness of the shading layer and depends on the choice of the shading model. Some embodiments of the shading model along with the corresponding smoothness term definitions are listed below.

If $\hat{S}_B^L$ is a full model, i.e., each pixel has a three-channel (e.g., red, green and blue) shading layer, $\hat{S}_B^L = \{\hat{S}_{B,1}^L, \hat{S}_{B,2}^L, \hat{S}_{B,3}^L\}$. Then either one of the following two options can be used. First, the smoothness is enforced for each layer separately using the Laplacian operator $\Delta$. Therefore, $$E_s = \sum_{i=1}^{3} \|\Delta \hat{S}_{B,i}^L\|_2^2$$

Second, the smoothness is enforced for both individual layer and cross layers. With that $$E_s = \sum_{i=1}^{3} \|\Delta \hat{S}_{B,i}^L\|_2^2 + \sum_{k,l} (\lambda_{12} E_{S,12}(k,l) + \lambda_{13} E_{S,13}(k,l) + \lambda_{23} E_{S,23}(k,l))$$

where (k, l) denotes a pair of neighboring pixels in the image space and $$E_{S,ij}(k,l) = \|(\Delta \hat{S}_{B,i}^L(k) - \Delta \hat{S}_{B,j}^L(k)) - (\Delta \hat{S}_{B,i}^L(l) - \Delta \hat{S}_{B,j}^L(l))\|_2^2$$

The first part is the difference between two channels (i,j) for pixel k, while the second part is the difference between the same two channels for the neighboring pixel l. The term then measures the difference between these two quantities to enforce consistent lighting color between neighboring pixels.

If the shading contains only one channel, the system can use the Laplacian of the layer directly $$E_s = \|\Delta \hat{S}_B^L\|_2^2$$

Customized shading model can also be used. One example is $$\hat{S}_B^L = \{\hat{S}_{B,1}^L, \delta_{B,2}, \delta_{B,3}\}$$

where the scalars $\delta_{B,2}$ and $\delta_{B,3}$ are constant across pixels. That is, for any pixel k, the customized shading produces $\hat{S}_{B,i}^L(k) = \hat{S}_{B,i}^L(k) + \delta_{B,i}$; i=2,3. With this model, the smoothness only needs to be enforced only the first channel. Therefore, this embodiment uses the same energy function $$E_s = \|\Delta \hat{S}_B^L\|_2^2$$

Additional embodiments use relaxed shading models that enable more variations in the second and the third layers. One embodiment defines:

$$\hat{S}_B^L = \{\hat{S}_{B,1}^L, \delta_{B,2}^r(p), \delta_{B,2}^c(q), \delta_{B,3}^r(p), \delta_{B,3}^c(q), |p=1,\ldots,\#rows; q=1,\ldots,\#columns\}$$

$$\hat{S}_{B,i}^L(k) = \hat{S}_{B,i}^L(k) + \delta_{B,i}^r(\text{row of } k) + \delta_{B,i}^c(\text{column of } k); i=2,3$$

This model enables the second layer to include two sets of values: $\delta_{B,2}^r(p)$ is constant for row p and $\delta_{B,2}^c(q)$ is constant for column q, and similarly for the third layer. In other words, both of the second and the third layers include n distinct values where n=#rows+#columns (in the previous model, n=1). With this model, the smoothness term can be defined as $$E_s = \|\Delta \hat{S}_B^L\|_2^2 + \sum_{i=2}^{3} \left( \sum_{p=2}^{\#rows} (\delta_{B,i}^r(p-1) - \delta_{B,i}^r(p))^2 + \sum_{q=2}^{\#columns} (\delta_{B,i}^c(q-1) - \delta_{B,i}^c(q))^2 \right)$$

On top of Laplacian for the first layer, the energy function further enforces the values between nearby rows (and columns) for the second and the third layers to be similar. Other customized shading models (e.g., block-wise constant) can also be used and similar smoothness energy function can be derived.

The term $E_r$ is a reference term that enforces the values in the target $\hat{R}_B^L$ to be consistent with the reference inside the region marked with no significant deviation in the mask, i.e., in the case where $\hat{M}(k)=0$ for pixel k. Therefore, the term is defined as $$E_r = \sum_k (1 - \hat{M}(k))(\hat{R}_B^L(k) - I_A^L(k))^2$$

As all individual terms $E_g$, $E_s$, $E_r$ are quadratic functions of the unknowns, minimizing the total cost $E_D$ can be done via solving a linear equation. Once the iterative procedure converges, the output of the image de-lighting module 616 is the final estimation of the reflectance layer $R_B = \exp(R_B^L)$.

Following the de-lighting process, de-lighted image $R_B^L$ and the reference image $I_A$, the goal of the detection module 620 is to identify the regions where significant deviations exist and to generate the deviation data 190. This can be achieve in several ways, including but not limited to, per-pixel detection, graph-based detection and learning-based detection.

The per-pixel detection compares these two images (i.e. the selected baseline image model 192 and the event image model 184) at each individual pixel in a certain color space. In one example, both images are converted to CIELab color space and the detection is done via thresholding on the a-channel and b-channel for each pixel k as follows:

$$\hat{M}(k) = |I_{A,a}(k) - R_{B,a}(k)| > \tau_a \text{ or } |I_{A,b}(k) - R_{B,b}(k)| > \tau_b$$

where $I_{A,a}$ and $I_{A,b}$ are the a-channel and b-channel of $I_A$ in CIELab space (similarly for $R_{B,a}$ and $R_{B,b}$); $\tau_a$ and $\tau_b$ are predefined thresholds.

Figure 10:
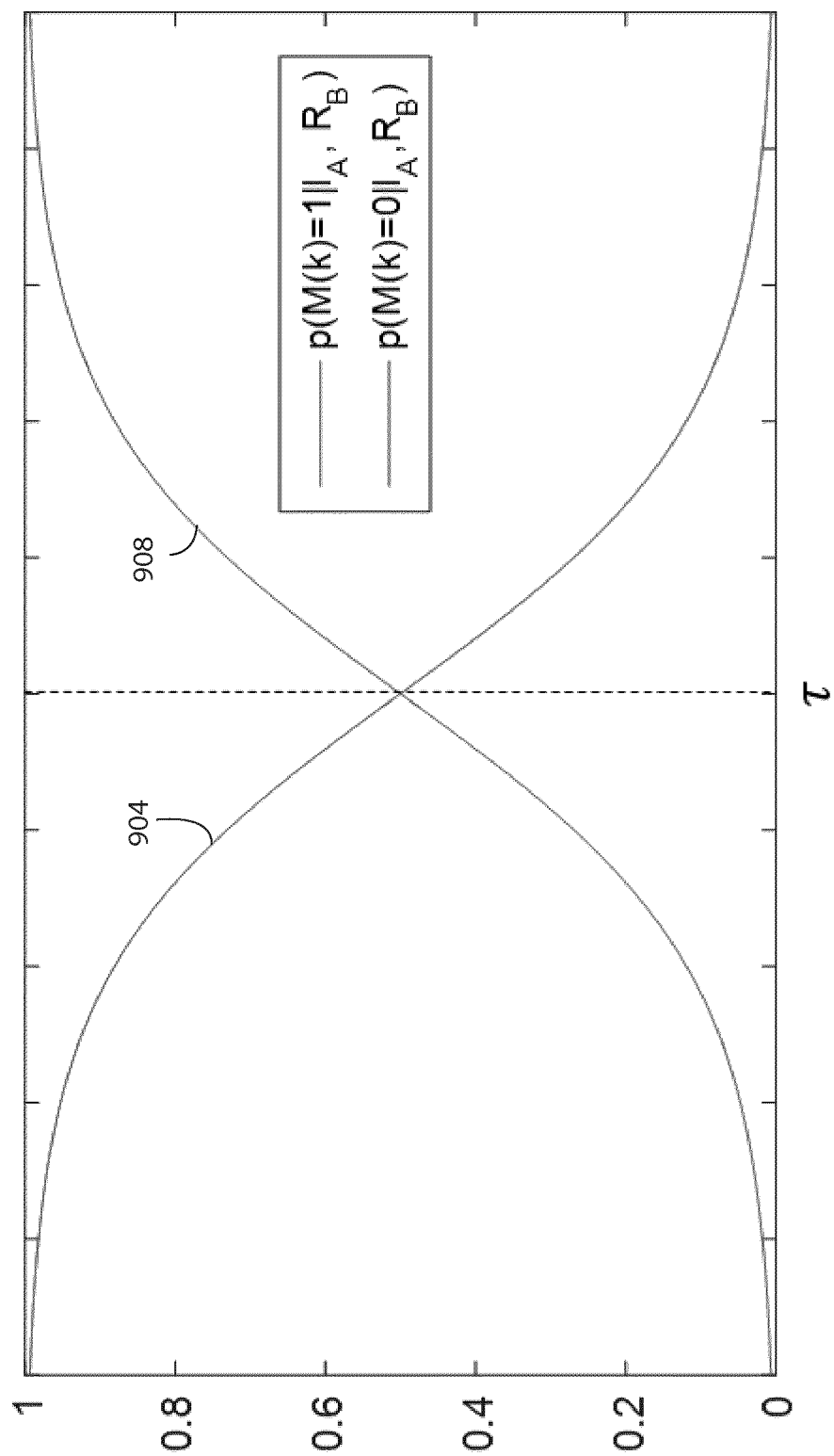
FIG. 10 is a graph depicting an example of the per-pixel probabilities for a graph-based detection method as used by the vehicle sensing system of FIG. 1.

The graph-based detection combines both the per-pixel measurement and spatial smoothness into consideration. The problem is typically formulated with Markov Random Field (MRF) and solved with Belief Propagation or Graph Cut. In one implementation, the probabilities of a pixel k is and is not in the region with significant deviation are defined via logistic functions as $$p(M(k) = 1 \mid I_A, R_B) = \frac{1}{1 + e^{-vd(k)}}$$

$$d(k) = \left( \sqrt{w_a(k)(I_{A,a}(k) - R_{B,a}(k))^2 + w_b(k)(I_{A,b}(k) - R_{B,b}(k))^2} \; - \tau \right)$$

$$p(M(k) = 0 \mid I_A, R_B) = 1 - p(M(k) = 1 \mid I_A, R_B)$$

where v is a parameter controlling the shape of the distribution function and τ is a threshold value similar to the role of $\tau_a$ and $\tau_b$ above. The weights $w_a(k)$ and $w_b(k)$ are used to leverage the importance of a-channel versus b-channel, which can be same or different across pixels. An example plot is shown in FIG. 10 with v=0.5. The smoothness term can use popular models such as Potts model that is based on the color similarity of the nearby pixels.

FIG. 10 depicts an example of the per-pixel probabilities for the graph-based detection method that is described above. The curve 904 depicts the conditional probability that M(k) is 0 given the value of $I_A$, $R_B$ and the curve 908 depicts the conditional probability that M(k) is 1 given the value of $I_A$, $R_B$. The point r represents the intersection where the curves 904 and 908 both have equal probabilities.

In the abovementioned methods, the color space is not limited to CIELab, other color spaces that attempts to separate illumination from chromaticity can be used, such as YCbCr. The output from the detection module is a refined binary mask $M^D$, along with the de-lighted image $R_B$ from previous module. In the case where certain attribute information is desired, as describes above regarding the system of FIG. 7, the module 620 leverages the relevant information in the prior model pool 180. For example, if the baseline image model 192 is labelled with each passenger seat 116 location, the system 124 can determine whether the detected deviation of the deviation data 190 is located in the left back seat 116 or right back seat 116.

With the mask $M^D$ defining the regions with significant deviations, this recognition module can be used to identify what are the reasons of these deviations. A non-exclusive list of typical reasons underlying a deviation includes the following reasons, such as objects left in the vehicle 100 among a pre-defined set (e.g., smartphones 308, wallets 312, keys), objects not in the pre-defined set, passenger not leaving, dirty seat, and damage to the vehicle interior, such as scratches.

State-of-the-art recognition engines can be trained using data that contain instances in these categories and applied to the region of interest which are cropped based on the mask $M^D$. The advantage here is the recognition can be done on the de-lighted image $R_B$ (for both training and testing). This way, the recognition engines can be trained to focus on distinguishing the different causes without the need to accommodate strong lighting variations.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

It will be appreciated that variants of the above-described and other features and functions, or alternatives thereof, may be desirably combined into many other different systems, applications, or methods. Various presently unforeseen or unanticipated alternatives, modifications, variations or improvements may be subsequently made by those skilled in the art that are also intended to be encompassed herein in the following embodiments.

What is claimed is:

1. A method for operating a vehicle including a vehicle sensing system, the method comprising:
    generating a plurality of baseline image models of a cabin of the vehicle based on image data of the cabin of the vehicle generated by an imaging device of the vehicle sensing system, the plurality of baseline image models generated before a passenger event;
    generating an event image model of the cabin of the vehicle based on image data of the cabin of the vehicle generated by the imaging device, the event image model generated after the passenger event;
    detecting a vehicle configuration based on vehicle setting data;
    selecting a baseline image model from the plurality of baseline image models for comparison with the event image model based on the detected vehicle configuration;
    identifying image deviations by comparing the event image model with the selected baseline image model with a controller of the vehicle sensing system, the image deviations corresponding to differences in the cabin of the vehicle from before the passenger event to after the passenger event; and
    operating the vehicle based on the identified image deviations.

2. The method as claimed in claim 1, wherein identifying image deviations further comprises:
    identifying an item located in the cabin of the vehicle after the passenger event that was not located in the cabin of the vehicle before the passenger event.

3. The method as claimed in claim 1, wherein generating the event image model of the cabin further comprises:
    generating at least one high-dynamic-range (HDR) image of the cabin of the vehicle, wherein the at least one HDR image is configured to reduce an impact of environmental lighting on the generation of the event image model of the cabin of the vehicle.

4. The method as claimed in claim 3, wherein:
generating the event image model of the cabin further comprises performing an image decomposition de-lighting process to decompose the at least one HDR image into a decomposed image including a reflectance layer and a shading layer, and
identifying the image deviations further comprises comparing the decomposed image with a reference image included in the selected baseline image model of the cabin of the vehicle.

5. The method as claimed in claim 4, wherein identifying the image deviations further comprises:
uses a per-pixel or a graph-based system to detect the deviations during the comparison of the decomposed image with the reference image.

6. The method as claimed in claim 1, wherein operating the vehicle based on the identified image deviations comprises:
generating notification data corresponding to the identified image deviations, and
transmitting the notification data to an electronic device of a passenger associated with the passenger event.

7. The method as claimed in claim 1, wherein operating the vehicle based on the identified image deviations comprises:
causing the vehicle to travel autonomously to a service center.

8. A vehicle sensing system for a corresponding vehicle, the vehicle sensing system comprising:
an imaging device configured to generate image data of a cabin of the vehicle;
a memory configured to store a plurality of baseline image models of the cabin of the vehicle that is generated prior to a passenger event; and
a controller operably connected to the imaging device and the memory, the controller configured to (i) generate an event image model of the cabin of the vehicle based on the generated image data after the passenger event, (ii) detect a vehicle configuration based on vehicle setting data, (iii) select a baseline image model from the plurality of baseline image models for comparison with the event image model based on the detected vehicle configuration, (iv) identify image deviations by comparing the event image model with the selected baseline image model, and (v) operate the vehicle based on the identified image deviations,
wherein the image deviations correspond to differences in the cabin of the vehicle from before the passenger event to after the passenger event.

9. The vehicle sensing system as claimed in claim 8, wherein the identified image deviations correspond to damage to the cabin of the vehicle and/or to an item located in the cabin of the vehicle after the passenger event that was not located in the cabin of the vehicle before the passenger event.

10. The vehicle sensing system as claimed in claim 8, wherein:
the generated image data includes at least one high-dynamic-range (HDR) image of the cabin of the vehicle, and
the at least one HDR image is configured to reduce an impact of environmental lighting on the generation of the event image model by the controller.

11. The vehicle sensing system as claimed in claim 10, wherein the controller is further configured (i) to generate the event image model of the cabin by performing an image decomposition de-lighting process to decompose the at least one HDR image into a decomposed image including a reflectance layer and a shading layer, and (ii) to identify the image deviations by comparing the decomposed image with a reference image included in the selected baseline image model of the cabin of the vehicle.

12. The vehicle sensing system as claimed in claim 11, wherein the controller is configured to use at least one of a per-pixel and a graph-based system to detect the deviations during the comparison of the decomposed image with the reference image.

13. The vehicle sensing system of claim 8, further comprising:
a transceiver operably connected to the controller,
wherein the controller is further configured to generate notification data corresponding to the identified image deviations, and
wherein the transceiver is configured to transmit the notification data to an electronic device of a passenger associated with the passenger event.

14. The vehicle sensing system of claim 8, wherein the controller is further configured to cause the vehicle to travel autonomously to a service center based on the identified image deviations.

15. The vehicle sensing system of claim 8, wherein the controller is further configured to prevent further passenger events from occurring based on the identified image deviations.

* * * * *